US011881699B2

(12) United States Patent
Cheng et al.

(10) Patent No.: US 11,881,699 B2
(45) Date of Patent: Jan. 23, 2024

(54) LOCKING MECHANISM AND BUSWAY DOCKETING BOX COMPRISING THE SAME

(71) Applicant: Schneider Electric Industries SAS, Rueil-Malmaison (FR)

(72) Inventors: ShiQi Cheng, GuangZhou (CN); JianLiang Huang, GuangZhou (CN); ZhaoWei Wang, GuangZhou (CN); Suman Shrestha, GuangZhou (CN); JianBin Rong, GuangZhou (CN); XianFeng Song, GuangZhou (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 298 days.

(21) Appl. No.: 17/343,269

(22) Filed: Jun. 9, 2021

(65) Prior Publication Data

US 2021/0408776 A1 Dec. 30, 2021

(30) Foreign Application Priority Data

Jun. 24, 2020 (CN) .......................... 202010588139.8

(51) Int. Cl.
*H02G 5/08* (2006.01)
*H02G 5/00* (2006.01)
*H01R 25/14* (2006.01)
*H02G 5/06* (2006.01)
*F16B 1/02* (2006.01)

(52) U.S. Cl.
CPC .............. *H02G 5/08* (2013.01); *H02G 5/005* (2013.01)

(58) Field of Classification Search
CPC ...... H01R 25/162; H01R 25/142; H02G 5/08; H02G 5/005; H02G 5/06; F16B 1/02
See application file for complete search history.

(56) References Cited

U.S. PATENT DOCUMENTS

| 3,757,063 | A | 9/1973 | Hart et al. |
| 2019/0052034 | A1* | 2/2019 | Orris .................... H01R 25/142 |
| 2022/0364713 | A1* | 11/2022 | Ladstätter ................ F21S 4/20 |

FOREIGN PATENT DOCUMENTS

| CN | 103573764 A | * | 2/2014 |
| CN | 103573764 A | | 2/2014 |
| CN | 205944969 U | | 2/2017 |
| GB | 2241278 A | | 8/1991 |

(Continued)

*Primary Examiner* — Hoa C Nguyen
*Assistant Examiner* — Amol H Patel
(74) *Attorney, Agent, or Firm* — Locke Lord LLP

(57) ABSTRACT

A locking mechanism is disclosed for being locked together with a structure to be engaged, the locking mechanism including: a driving member, which is capable of moving in a driving direction; a first driven member and a second driven member, both of which are disposed axially symmetrically with respect to the driving direction and are coupled with the driving member so as to be driven by the driving member to move toward or away from each other along a driven direction of each of the first driven member and the second driven member respectively, the driven direction of each of the first driven member and the second driven member being transverse or oblique to the driving direction; an actuating handle, which is coupled with the driving member to move the driving member in the driving direction.

14 Claims, 7 Drawing Sheets

(56) References Cited

FOREIGN PATENT DOCUMENTS

| JP | 5934429 U | | 3/1984 |
|---|---|---|---|
| JP | 2014103845 A | | 6/2014 |
| JP | 2019029156 A | * | 2/2019 |
| JP | 2019029156 A | | 2/2019 |

* cited by examiner

LOCKING MECHANISM AND BUSWAY DOCKETING BOX COMPRISING THE SAME

CROSS-REFERENCE TO RELATED APPLICATION

This application claims priority of the Chinese Patent Application No. 202010588139.8 filed on Jun. 24, 2020, the content disclosed in which is incorporated herein by reference in their entirety.

TECHNICAL FIELD

The present disclosure relates to a locking mechanism, and further relates to a busway docketing box comprising the locking mechanism.

BACKGROUND

At present, there are various track bus for the data center, which have corresponding busways, and sometimes it is necessary to install a docketing box on the busway to realize various functions. However, the current busway docketing box is complicated to be installed, which requires extra tools, manual position adjustment or multi-person cooperation. Therefore, it is desirable to provide a busway docketing box which can overcome the above disadvantages.

SUMMARY

The present disclosure provides a locking mechanism, which can be installed on a busway docketing box, for example, so as to be conveniently engage with a busway. The present disclosure also provides a busway docketing box.

According to a first aspect of the present disclosure, a locking mechanism is provided for being locked together with a structure to be engaged, the locking mechanism comprising: a driving member, which is capable of moving in a driving direction; a first driven member and a second driven member, both of which are disposed axially symmetrically with respect to the driving direction and are coupled with the driving member so as to be driven by the driving member to move toward or away from each other along a driven direction of each of the first driven member and the second driven member respectively, the driven direction of each of the first driven member and the second driven member being transverse or oblique to the driving direction; an actuating handle, which is coupled with the driving member to move the driving member in the driving direction.

Further, the driving member comprises two driving member slide rails which are disposed axially symmetrically and obliquely relative to the driving direction, wherein each of the first driven member and the second driven member comprises one driven member slide rail which is oblique relative to the driving direction, and each of the driven member slide rails is nested in the corresponding driving member slide rails respectively.

Further, the first driven member and the second driven member are connected by a spring configured to apply force to the first driven member and the second driven member, to tend to move the first driven member and the second driven member toward each other.

Further, each of the first driven member and the second driven member comprises a claw configured to catch the structure to be engaged.

The locking mechanism further comprises a cover plate; each of the first driven member and the second driven member comprises a guide channel arranged parallel to its respective driven direction; wherein the cover plate is provided with protrusions which are respectively engaged in the guide channel of each of the first driven member and the second driven member, so that the first driven member and the second driven member can slide on the corresponding protrusions along their respective driven directions.

Further, the guide channel of each of the first driven member and the second driven member is an obround-shaped through hole, and the protrusions are configured as posts passing through the obround-shaped through hole.

The locking mechanism further comprises a trigger which is arranged on a cover plate of the locking mechanism and comprises a position limiting post, and the structure to be engaged can contact the trigger and move the trigger; wherein one or both of the first driven member and the second driven member comprises a position limiting boss; wherein, the position limiting post comprises a stop surface, and the position limiting boss comprises a stop surface; wherein when the stop surface of the position limiting post faces the stop surface of the position limiting boss, the position limiting post is in a position limiting location to prevent the first driven member and the second driven member from moving toward each other along their respective driven directions.

Further, the trigger further comprises a return spring connected with the position limiting post, and the return spring is configured to apply a force to the position limiting post toward the position limiting location.

Further, the position limiting post comprises a guide surface and the position limiting boss comprises a guide surface; the guide surface of the position limiting post and the guide surface of the position limiting boss are arranged parallel to the driven direction of said one or both of the first driven member and the second driven member; when the guide surface of the position limiting post faces and contacts with the guide surface of the position limiting boss, the position limiting post is in the non-limiting location, allowing the first driven member and the second driven member to move away from each other along their respective driven directions.

Further, the actuating handle is coupled with the driving member through a link, and the actuating handle moves the link by sliding or rotating, so as to drive the driving member.

Further, the actuating handle comprises an interference fit structure, and when the actuating handle starts to drive the driving member, the actuating handle overcomes the interference fit before it moves.

Further, the actuating handle comprises a self-locking spring inside the actuating handle, and the self-locking spring can lock the actuating handle in a self-locked position.

According to a second aspect of the present disclosure, a busway docketing box is provided, which comprises a locking mechanism provided on one or both sides thereof, the busway docketing box being able to engage with a busway by the locking mechanism, wherein the locking mechanism comprising: a driving member, which is capable of moving in a driving direction; a first driven member and a second driven member, both of which are disposed axially symmetrically with respect to the driving direction and are coupled with the driving member so as to be driven by the driving member to move toward or away from each other along a driven direction of each of the first driven member and the second driven member respectively, the driven direction of each of the first driven member and the second driven member being transverse or oblique to the driving direction; an actuating handle, which is coupled with the driving member to move the driving member in the driving direction.

Further, the busway docketing box further comprises a guide plate which guides the busway docketing box to move along the busway.

Further, the busway docketing box also comprises a protection plate which can only be inserted into a particular slot on the busway.

The locking mechanism of the present disclosure and, the busway docketing box using the locking mechanism have various advantages, such as: 1) the locking mechanism is safe and reliable, easy to operate, and can be applied at any position, which does not need additional installation tools, and can realize single-person installation, which is simple and efficient; 2) it has a protective plate as an anti-incorrect installation design, which avoids accidents and is safe and reliable; 3) actuating handle has self-locking function, the trigger opens and closes automatically in the process of assembly and disassembly, and the claws can automatically press the busway. It should be understood by those skilled in the art that the locking mechanism can also be used for engaging any other object to the structure to be engaged.

BRIEF DESCRIPTION OF DRAWINGS

In order to explain the technical solutions of the embodiments of the present disclosure more clearly, the following will briefly introduce the drawings that need to be used in the embodiments. It should be understood that the following drawings only show certain embodiments of the present disclosure, and therefore should not be regarded as a limitation of the scope of protection. For those of ordinary skill in the art, other relevant drawings can be obtained based on these drawings without creative work.

DETAILED DESCRIPTION

The present disclosure provides a locking mechanism, which can be installed on either or both sides of a busway docketing box X to hang the busway docketing box X on a busway Y. It should be understood that the locking structure can also be used to hang other objects to any structure, so as to lock the object with the structure to be engaged together. Herein, the busway Y can be deemed as the structure to be engaged.

Figure 1:
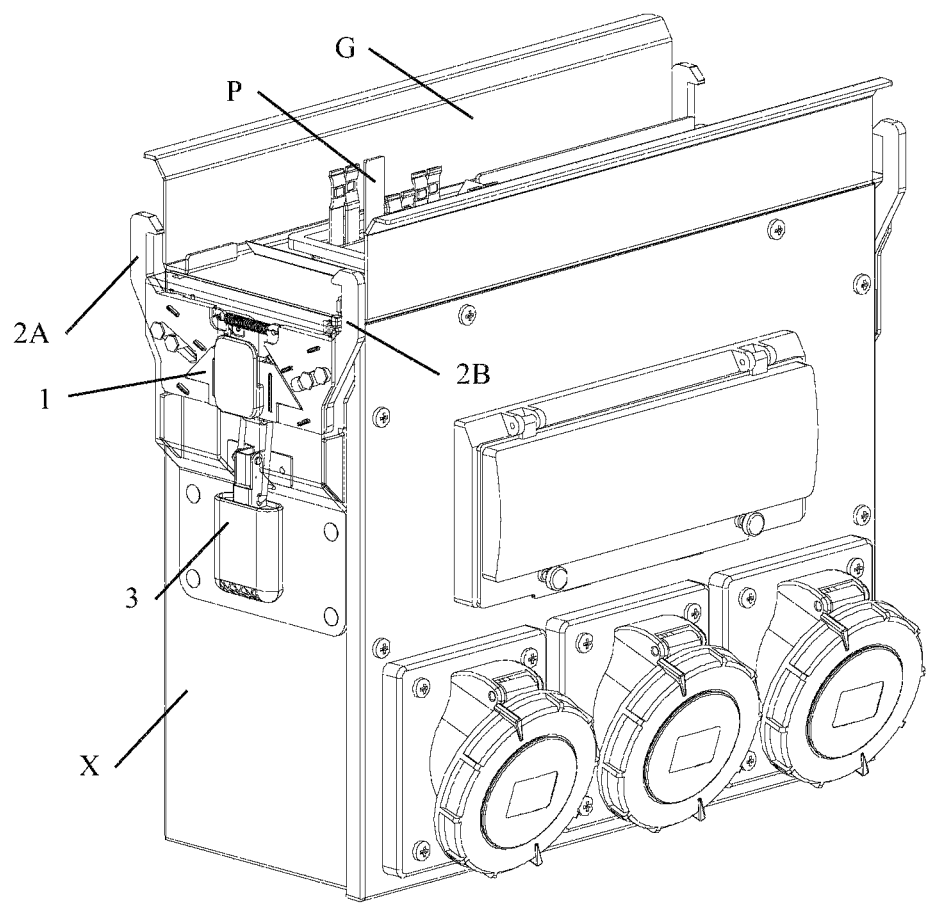
FIG. 1 is a view of a locking mechanism and a busway docketing box including the locking mechanism according to the present disclosure.
Figure 2:
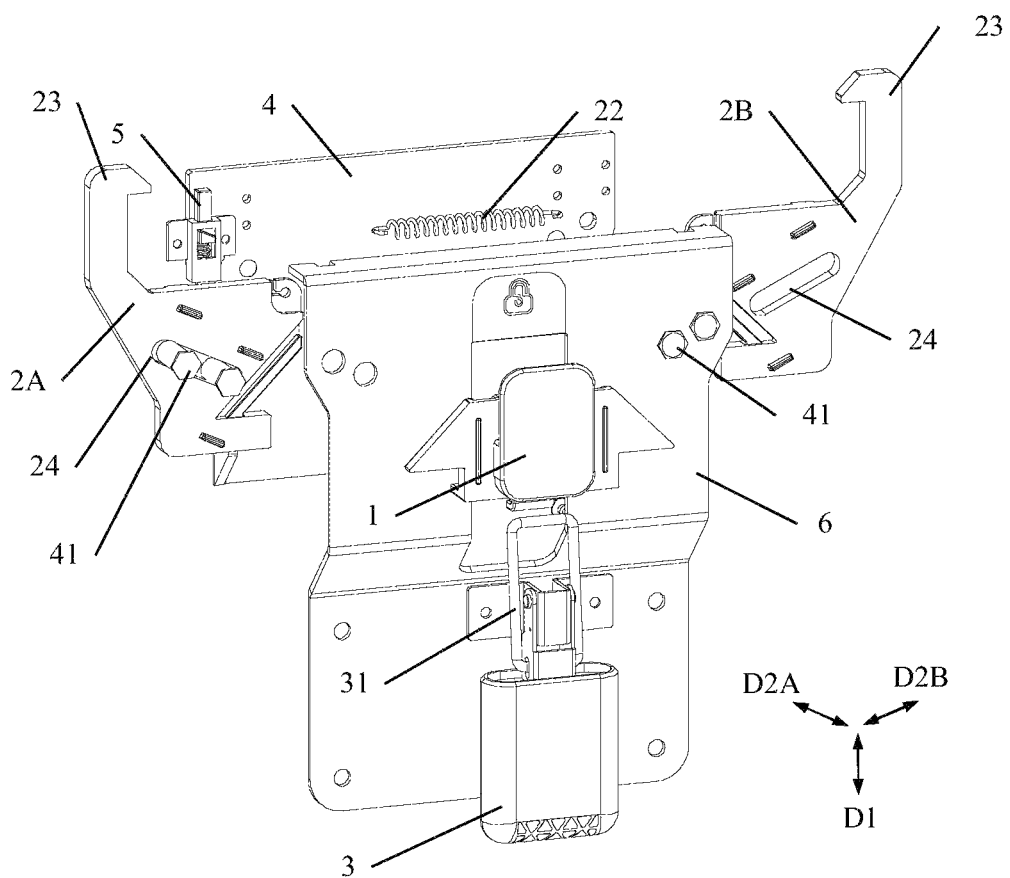
FIG. 2 is an exploded view of the locking mechanism according to the present disclosure.

Referring to FIGS. 1 and 2, the locking mechanism according to a preferred embodiment mainly comprises a driving member 1, a first driven member 2A, a second driven member 2B, and an actuating handle 3.

The driving member 1 can move in a driving direction, which, for example, is a vertical direction D1 as shown in the figure.

The first driven member 2A and the second driven member 2B are symmetrically arranged with respect to the driving direction D1 and are coupled with the driving member 1 so as to be driven by the driving member 1, to move toward or away from each other in respective driven directions which are transverse or oblique relative to the driving direction. Here, the respective driven direction of each of the first driven member 2A and the second driven member 2B is, for example, a horizontal direction transverse to the vertical direction, or the direction D2A and D2B oblique toward the right and left respectively with respect to the driving direction D1 (as shown in the figures) according to the preferred embodiment of the present disclosure, wherein the driven direction D2A corresponds to the first driven member 2A and the driven direction D2B corresponds to the second driven member 2B. It should be understood that the driving member can reciprocate in the driving direction, and then the two driven members can reciprocate in their respective driven directions accordingly.

The actuating handle 3 is coupled with the driving member 1 to move the driving member 1 in the driving direction.

It should be understood that, according to different applications, the driving direction and the driven direction can be different from those described herein, which should be determined according to the structure to be engaged by the locking mechanism. For example, when the locking mechanism is to be engaged with a structure horizontally, the driving direction and then the driven directions will become horizontal.

Figure 3:
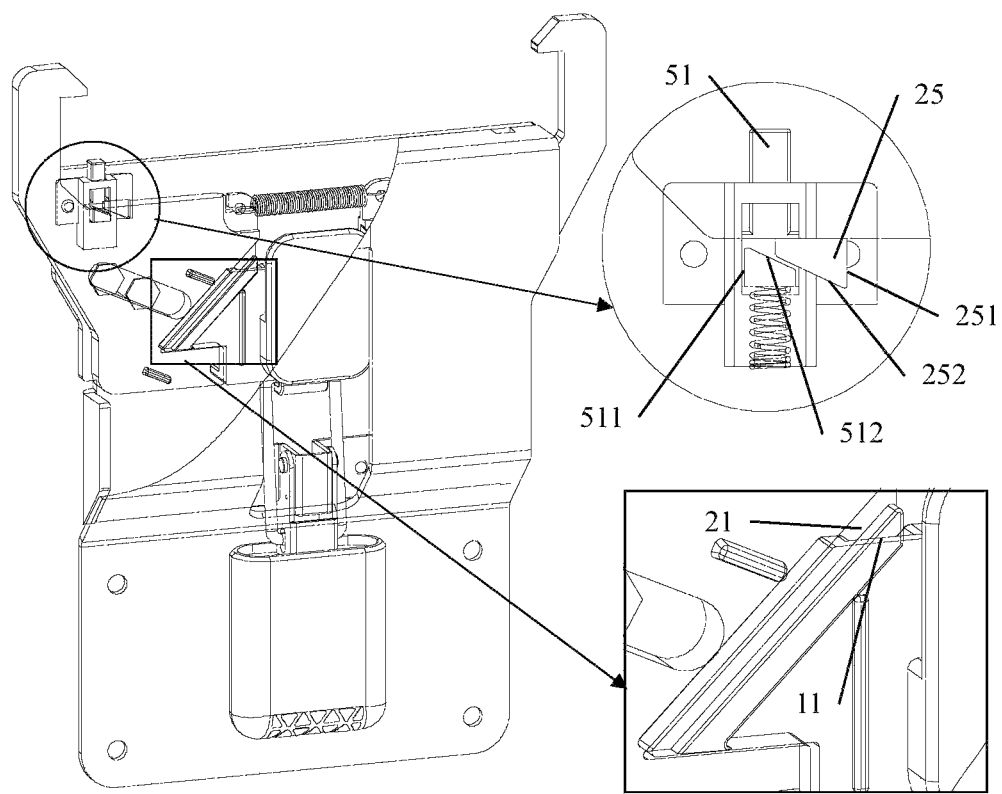
FIG. 3 is a partial enlarged view of the locking mechanism according to the present disclosure.

According to a preferred embodiment, as shown in FIGS. 2 and 3, the driving member 1 comprises two driving member slide rails 11 which are disposed axially symmetrically and obliquely relative to the driving direction. Accordingly, the first driven member 2A and the second driven member 2B each comprises one driven member slide rail 21 which is oblique relative to the driving direction. Each of the driven member slide rails 21 of the first driven member 2A and the second driven member 2B is nested in the corresponding driving member slide rails 11 respectively. Specifically, each of the slide rails 11 and 21 may comprise a groove and a flange, so that the flange of the slide rail 21 is nested in the groove of the slide rail 11, while the flange of the slide rail 11 is nested in the groove of the slide rail 21. The enlarged view in FIG. 3 shows that one of the driving member slide rails 11 engaged with the driven member slide rail 21 of the first driven member 2A.

Furthermore, the oblique directions of the driving member slide rail 11 and the driven member slide rail 21 are set such that when the driving member 1 moves in the driving direction, the driving member slide rail 11 slides in the driven member slide rail 21, to push or pull the driven member slide rail 21, thereby to push or pull the first driven member 2A and the second driven member 2B to move toward or away from each other accordingly.

Although in the preferred embodiment, the driving member 1 drives the first driven member 2A and the second driven member 2B through the driving member slide rail 11 and the driven member slide rail 21, providing a simple and reliable driving mode, it should be understood that the driving member 1 can drive the two driven members 2A and 2B through other mechanisms. For example, a gear driving mechanism, and/or a link driving mechanism, etc. can be provided between them, as long as the above-mentioned driving, of the two driven members 2A and 2B by the driving member 1 can be realized.

Further preferably, the first driven member 2A and the second driven member 2B can be connected by a spring 22. The spring 22 can apply a force to the first driven member 2A and the second driven member 2B to tend to move the first driven member and the second driven member toward each other. Specifically, when the first driven member 2A and the second driven member 2B move away from each other along their respective driven directions, the spring 22 can always exert tension between them, which makes them tend to move toward each other. Therefore, when the trigger 5 described later releases its position limiting effect, the spring 22 can automatically pull the first driven member 2A and the second driven member 2B toward each other, and then the first driven member 2A and the second driven member 2B can push the driving member 1 downwardly in the driving direction for the next time.

Preferably, the first driven member 2A and the second driven member 2B each may further comprise a claw 23 configured to catch the structure to be engaged. Claws 23 are provided at the ends of the first driven member 2A and the second driven member 2B respectively, for example, as shown in FIG. 2. Further, other claws or engaging parts may be provided at other positions, in addition to the ends, of the first driven member 2A and the second driven member 2B to engage with corresponding parts on the structure to be engaged.

Preferably, the locking mechanism further comprises cover plates, such as a rear cover plate 4 and a front cover plate 6. It should be understood that the front cover plate 4 and the rear cover plate 6 may also be integrated into a housing for covering and accommodating various components of the locking mechanism.

According to a preferred embodiment, for example, a protrusion 41, such as being configured as a post 41, is provided on the rear cover plate 4. Each of the first driven member 2A and the second driven member 2B comprises a guide channel 24 arranged parallel to its respective driven direction, such as a long through hole 24, as shown in FIG. 2. The protrusions 41 can be engaged in the guide channels 24 of the first driven member 2A and the second driven member 2B, respectively, so that the first driven member 2A and the second driven member 2B can slide on the corresponding protrusions 41 in their respective driven directions. In the illustrated embodiment, the post 41 passes through the long through holes 24 of the first driven member 2A and the second driven member 2B, so that the first driven member 2A and the second driven member 2B can slide on the post 41 along their respective driven directions.

Due to this arrangement of the long through hole 24, when the driving member 1 drives the first driven member 2A and the second driven member 2B in the driving direction, the two driven members 2A and 2B will be separated from each other along their respective driven directions under the guidance of the long through holes 24 and the posts 41 inside the long through holes, and when the two driven members 2A and 2B are pulled by the spring 22, the two driven members 2A and 2B will also be guided by the long through holes 24 and the posts 41 to move toward each other.

Preferably, each long through hole 24 is an obround-shaped through hole, and each of the protrusion 41 is a post 41, and two posts 41 are accommodated in each obround-shaped through hole 24. Furthermore, it should be understood that each protrusion 41 may also be connected to the front cover plate 6. For example, the posts 41 each is preferably a nut post which can be screwed to the rear cover plate 4 and/or the front cover plate 6.

Although in the illustrated embodiment, the driven member is guided to move away from/toward each other through the cooperation between the obround-shaped through holes and the posts, after understanding its principle, the skilled person can also adopt other structures to realize this guiding function, for example, the guiding channel and the protrusions can also be configured as dovetail groove and tenon.

In addition, as in the preferred embodiment of the present disclosure, when the driven direction of each driven member is set, to be oblique relative to the driving direction, since the two driven members 2A and 2B are applied with a force by the spring 22, they always have a tendency to move obliquely downwardly along the driven direction, thereby exerting an downwardly oblique pressing force on the structure to be engaged, which can better ensure the engagement of the locking mechanism with the structure to be engaged and prevent the locking mechanism from getting loose.

According to a further preferred embodiment, the locking mechanism further comprises a trigger 5. Referring to the enlarged circular portions in FIGS. 3 and 4, and FIG. 5, the trigger 5 may be arranged on the rear cover plate 4 of the locking mechanism and comprise a position limiting post 51. Accordingly, one or both of the first driven member 2A and/or the second driven member 2B may comprise a position limiting boss 25. In the embodiment as shown in the figures, only the position limiting boss 25 on the first driven member 2A is shown. In other embodiments, a position limiting boss may be provided on the second driven member 2B, and then the trigger 5 may be provided accordingly. In a further embodiment, both of the first driven member 2A and the second driven member 2A may be respectively provided with position limiting bosses 25, and then two triggers 5 may be provided accordingly.

In this embodiment, the position limiting post 51 comprises a stop surface 511 and the position limiting boss 25 comprises a stop surface 251, so that when the stop surface 511 of the position limiting post 51 faces the stop surface 251 of the position limiting boss 25, the position limiting post 51 is in a position limiting location to prevent the first driven member 2A and the second driven member 2B from moving toward each other in the driven direction. That is, in the position limiting location, even if the driving member 1 or other external force acts on the two driven members 2A and 2B, the driven members 2A and 2B will not move toward each other, thus avoiding accidents.

Figure 4:
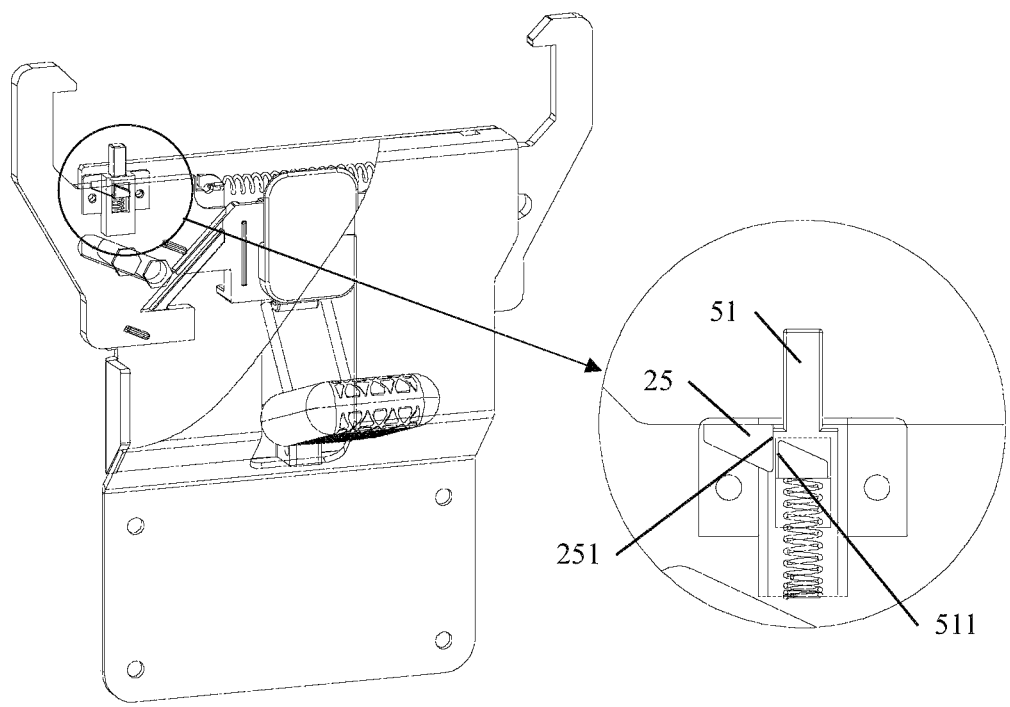
FIG. 4 is a partial enlarged view of the locking mechanism according to the present disclosure.

For the sake of clarity in figures, the stop surface 511 of the position limiting post 51 and the stop surface 251 of the position limiting boss 25 in FIG. 4 are shown to be separated by a distance. However, in this embodiment, since the spring 22 always exerts a pulling force on the first driven member 2A and the second driven member 2B, the stop surface 251 of the position limiting boss 25 will press against the stop surface 511 of the position limiting post 51, thus preventing the first driven member 2A and the second driven member 2B from moving toward each other.

Further preferably, the trigger 5 further comprises a return spring 52 connected with the position limiting post 51, and the return spring 52 can apply a force to the position limiting post 51 toward the position limiting location.

Furthermore, the trigger 5 is also arranged to be actuated by the structure to be engaged. As shown in FIGS. 3, 4 and 7-9, when a structure such as the busway Y contacts the top of the position limiting post 51 of the trigger 5 and presses it down, the trigger 5 moves downwardly by overcoming the force of the return spring 52 until the stop surface 511 of the position limiting post 51 leaves the stop surface 251 of the position limiting boss 25, and the position limiting post 51 will release the position limiting effect on the position limiting boss 25, so that the first driven member 2A and the second driven member 2B will move toward each other under the pulling of the spring 22 (or by the driving action from the driving member 1), so as to engage with the structure to be engaged (such as the busway Y).

Further preferably, the position limiting post 51 may also comprise a guide surface 512, and the position limiting boss 25 may also comprise a guide surface 252. Preferably, the guide surface 512 and the guide surface 252 may be arranged parallel to the driven direction of the first driven member 2A and/or the second driven member 2B on which the position limiting boss is disposed, for example, as shown in the figure. In other words, the guide surface 512 and the guide surface 252 are arranged approximately parallel to the driven direction of the driven member on the side where the trigger 5 is located, that is to say, in consistent with the oblique direction of the corresponding guide channel.

Due to this arrangement, in this embodiment, after the trigger 5 is pressed down by the structure to be engaged and the first driven member 2A and the second driven member 2B have been engaged on the structure, the return spring 52 exerts a force on the position limiting post 51 toward the position limiting location, so that the guide surface 512 of the position limiting post 51 and the guide surface 252 of the position limiting boss 25 face each other, and the position limiting post 51 is in the non-limiting location at this time. When the user moves the driving member 1 in the driving direction through an actuator 3 described later, the driving member 1 will move the first driven member 2A and the second driven member 2B away from each other as described above, which will allow the first driven member 2A and the second driven member 2B to smoothly move away from each other in their respective driven directions due to the above arrangement of the guide surface 512 of the position limiting post 51 and the guide surface 252 of the position limiting boss 25.

Figure 5:
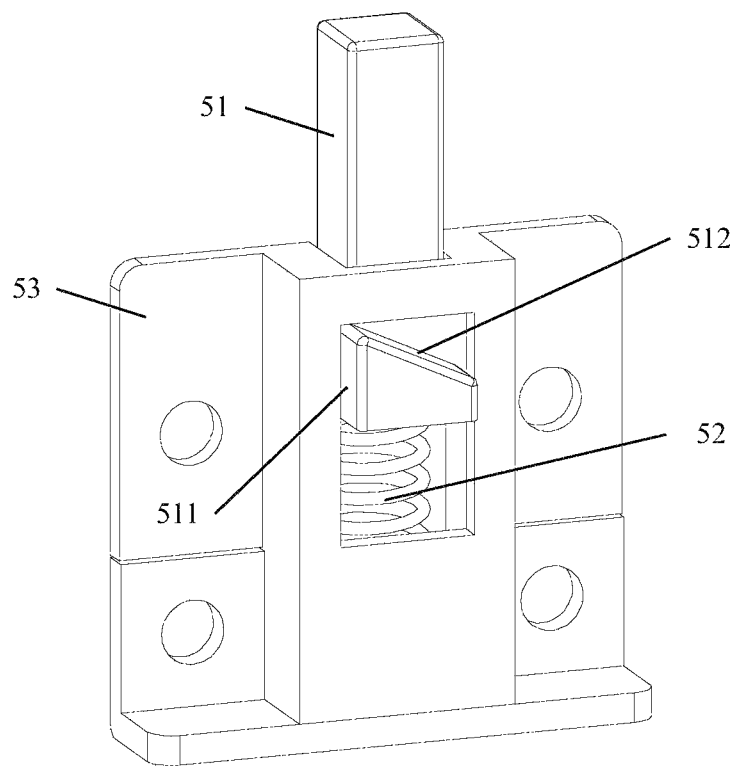
FIG. 5 is a view of the trigger.

FIG. 5 shows a preferred structure of the trigger 5, which is mounted to the rear cover plate 4 of the locking mechanism by a fixing member 53, and the fixing member 53 comprises an inner chamber for accommodating the position limiting post 51 and the spring 52. Furthermore, the stop surface 511 and the guide surface 512 of the position limiting post 51 can be exposed through an opening on the fixing member 53, so as to abut against the stop surface 251 and the guide surface 252 of the position limiting boss 25 in the position limiting location or the non-limiting location, respectively. It should be understood that the trigger can also be fixed to the front cover plate 6, and then only the position limiting boss on the driven member needs to be changed accordingly.

After understanding the above principles, the skilled person can also design other forms of position limiting features on the trigger and the driven member.

Figure 6:
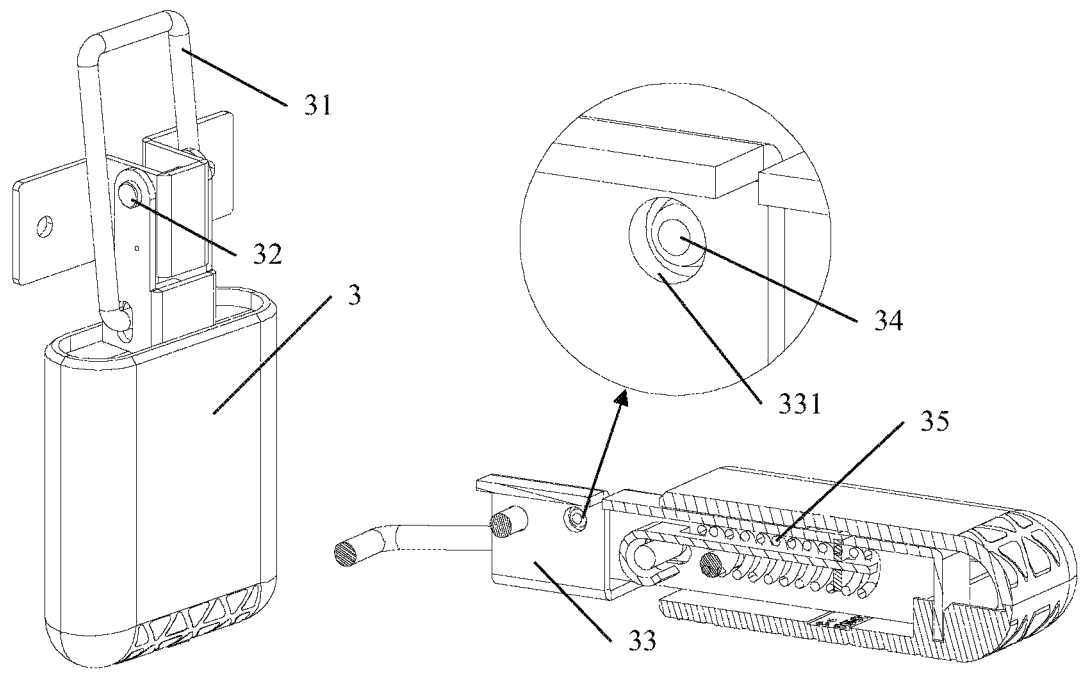
FIG. 6 is a view of the actuating handle.

Next, the actuating, handle 3 will be described with reference to FIG. 6. The actuating handle 3 comprises a link 31 which is coupled with the driving member 1, and in the preferred embodiment, the actuating handle 3 moves the link 31 by rotating. Specifically, the actuating handle 3 can be fixed to the front cover plate 6 and can pivot about the pivot 32. When the user pivots the actuating handle 3 upwardly, the link 31 will make the driving member 1 to move in the driving direction. It should be understood that the purpose of the actuating handle 3 is to move the driving member 1 in the driving direction, and therefore, the actuating handle 3 can be realized by any structure that can move along a straight line, for example, as long as it can achieve this purpose.

Preferably, the actuating handle 3 may comprise a self-locking spring 35 in its interior, which can lock the actuating handle 3 in a self-locked position. When the handle rotates inwardly to a closed position, the actuating handle 3 is in a self-locked state under the action of spring force, so that it will not rattle or bounce off in the working state.

Preferably, the actuating handle 3 can also comprise an interference fit structure. As shown in the enlarged view of FIG. 6, the fixing member 33 of the actuating handle 3 has a hole or recess 331, while the actuating handle 3 has a bump 34. When the bump 34 is located in the hole or recess 331, they form an interference fit structure, so that when the actuating handle 3 starts to drive the driving member 1, the interference fit needs to be overcome before moving. This arrangement can effectively prevent accidental touch and accidental vibration from popping off the actuating handle, and further improve the stability and safety of the mechanism.

Next, a preferred application of the locking mechanism according to the present disclosure will be described with reference to FIGS. 7-11.

Figure 7:
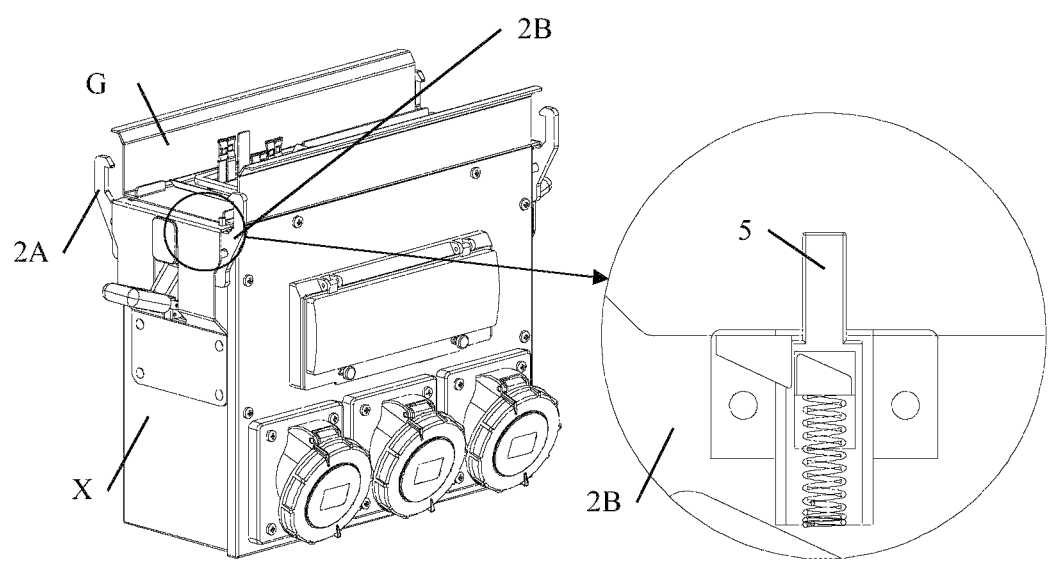
FIG. 7 is a view of the busway docketing box including the locking mechanism according to the present disclosure.

As shown in FIG. 7, the busway docketing box X comprises the locking mechanism of the present disclosure provided on one side or both sides thereof, and the busway docketing box X can be engaged to the busway Y, which is the structure to be engaged as described above.

FIG. 7 shows a state where the busway docketing box X is ready to be installed, in which the trigger 5 (in the embodiment as shown, the trigger 5 is disposed to interact with the second driven member 2B) is in a position limiting location, and therefore, the first driven member 2A and the second driven member 2B are in a state away from each other and cannot move toward each other.

Figure 8:
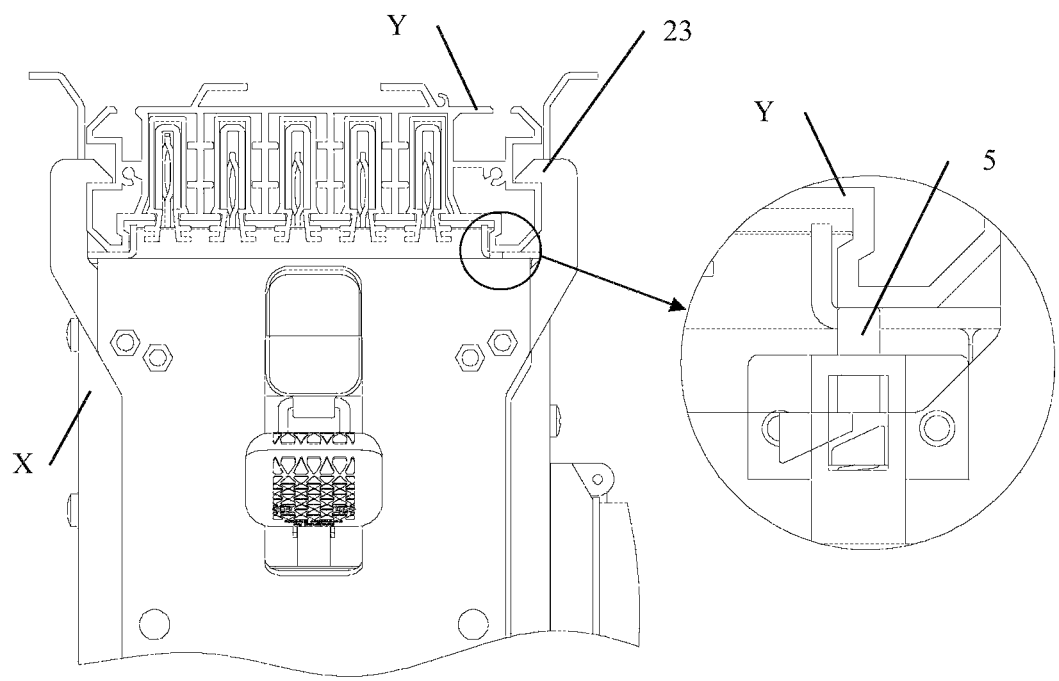
FIG. 8 is a view of the busway docketing box according to the present disclosure, showing that the trigger is pressed.

FIG. 8 shows that the busway docketing box X has been installed in the busway Y, and the trigger 5 is pressed down by the bottom of the busway Y, thus releasing the position limiting effect of the trigger 5. The first driven member 2A and the second driven member 2B automatically move toward each other under the action of the spring 22, and their claws 23 are clamped to the corresponding portion of the busway Y, thus locking and hanging the busway docketing box X under the busway Y.

Preferably, the busway docketing box X may further comprise a guide plate G, which can guide the busway docketing box X to move along the busway Y, thereby facilitating the busway docketing box X to smoothly engage with the busway Y.

Figure 9:
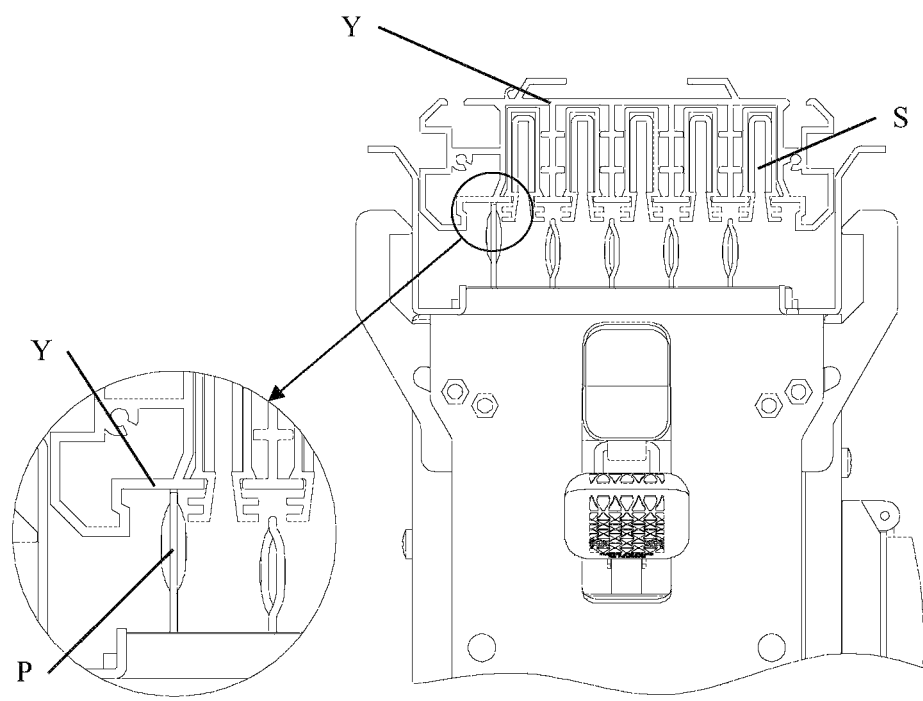
FIG. 9 is a view of the busway docketing box according to the present disclosure, showing that the protection plate is not blocked by the busway.

Preferably, the busway docketing box X may further comprise a protection plate P, which is, for example, arranged at the top of the busway docketing box X and can only be inserted into a particular slot S on the busway Y. FIG. 9 shows that the busway docketing box X is incorrectly aligned with the busway Y, and the protection plate P is blocked by the bottom of the busway Y, so that the terminals on the busway docketing box X cannot be further inserted into the slots of the busway Y, thus avoiding unexpected situations. Only when the protection plate P can be inserted into the particular slot S in the busway Y, each terminal on the busway docketing box X can be further inserted into the corresponding slot of the busway Y.

Figure 10:
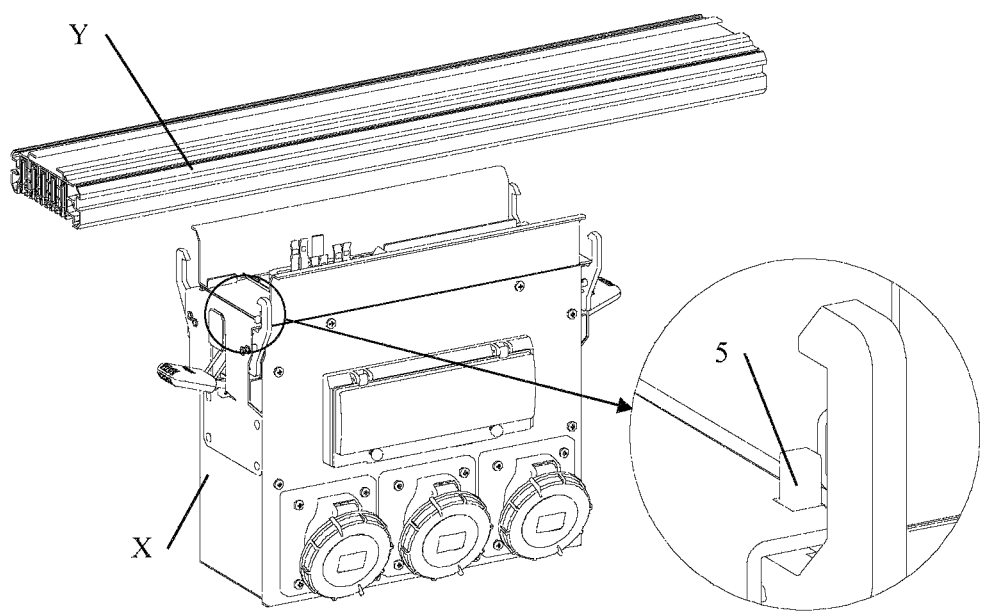
FIG. 10 is a view before the busway is engaged with the busway docketing box according to the present disclosure.
Figure 11:
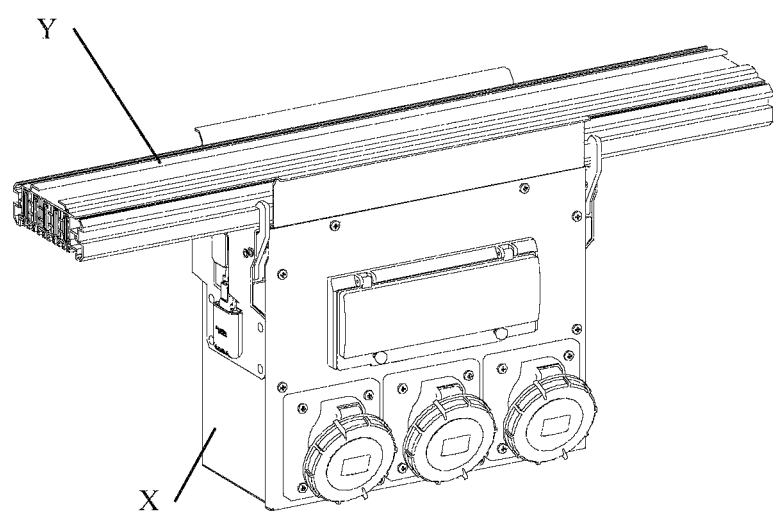
FIG. 11 is a view after the busway is engaged with the busway docketing box according to the present disclosure.

FIGS. 10 and 11 show the process of engagement of the busway docketing box X with the busway Y. FIG. 10 shows that the actuating handle is rotated upwardly to drive the driving member to move, so that the first driven member and the second driven member move away from each other, ready to engage with the busway Y, and the trigger 5 is ejected and in the position limiting location. FIG. 11 shows that the busway docketing box X has been engaged with the busway Y, and the first driven member and the second driven member move toward each other and then are clamped on the busway Y by the claws, and the actuating handle returns and locks the position, thereby locking and hanging the busway docketing box X under the busway Y.

The locking mechanism of the present disclosure and the busway docketing box using the locking mechanism have various advantages, such as: 1) the locking mechanism is safe and reliable, easy to operate, and can be applied at any position, which does not need additional installation tools, and can realize single-person installation, which is simple and efficient; 2) it has a protective plate as an anti-incorrect installation design, which avoids accidents and is safe and reliable; 3) actuating handle has self-locking function, the trigger opens and closes automatically in the process of assembly and disassembly, and the claws can automatically press the busway. It should be understood by those skilled in the art that the locking mechanism can also be used for engaging any other object to the structure to be engaged.

The scope of the present disclosure is not limited by the above-described embodiments, but by the appended claims and their equivalents.

What is claimed is:

1. A locking mechanism for being locked together with a structure to be engaged, the locking mechanism comprising:
a driving member, which is capable of moving in a driving direction;
a first driven member and a second driven member, both of which are disposed axially symmetrically with respect to the driving direction and are coupled with the driving member so as to be driven by the driving member to move toward or away from each other along a driven direction of each of the first driven member and the second driven member respectively, the driven direction of each of the first driven member and the second driven member being transverse or oblique to the driving direction;
an actuating handle, which is coupled with the driving member to move the driving member in the driving direction;
wherein, the driving member comprises two driving member slide rails which are disposed axially symmetrically and obliquely relative to the driving direction, wherein each of the first driven member and the second driven member comprises one driven member slide rail which is oblique relative to the driving direction, and each of the driven member slide rails is nested in the corresponding driving member slide rails respectively.

2. The locking mechanism according to claim 1, wherein the first driven member and the second driven member are connected by a spring configured to apply force to the first driven member and the second driven member, to tend to move the first driven member and the second driven member toward each other.

3. The locking mechanism according to claim 1, wherein each of the first driven member and the second driven member comprises a claw configured to catch the structure to be engaged.

4. The locking mechanism according to claim 1, further comprising a cover plate;
each of the first driven member and the second driven member comprises a guide channel arranged parallel to its respective driven direction;
wherein the cover plate is provided with protrusions which are respectively engaged in the guide channel of each of the first driven member and the second driven member, so that the first driven member and the second driven member can slide on the corresponding protrusions along their respective driven directions.

5. The locking mechanism according to claim 4, wherein the guide channel of each of the first driven member and the second driven member is an obround-shaped through hole, and the protrusions are configured as posts passing through the obround-shaped through hole.

6. The locking mechanism according to claim 1, further comprising a trigger which is arranged on a cover plate of the locking mechanism and comprises a position limiting post, and the structure to be engaged can contact the trigger and move the trigger;
wherein one or both of the first driven member and the second driven member comprises a position limiting boss;
wherein, the position limiting post comprises a stop surface, and the position limiting boss comprises a stop surface;
wherein when the stop surface of the position limiting post faces the stop surface of the position limiting boss, the position limiting post is in a position limiting location to prevent the first driven member and the second driven member from moving toward each other along their respective driven directions.

7. The locking mechanism according to claim 6, wherein the trigger further comprises a return spring connected with the position limiting post, and the return spring is configured to apply a force to the position limiting post toward the position limiting location.

8. The locking mechanism according to claim 7, wherein the position limiting post comprises a guide surface and the position limiting boss comprises a guide surface;
the guide surface of the position limiting post and the guide surface of the position limiting boss are arranged parallel to the driven direction of said one or both of the first driven member and the second driven member;
when the guide surface of the position limiting post faces and contacts with the guide surface of the position limiting boss, the position limiting post is in the non-limiting location, allowing the first driven member and the second driven member to move away from each other along their respective driven directions.

9. The locking mechanism according to claim 1, wherein the actuating handle is coupled with the driving member through a link, and the actuating handle moves the link by sliding or rotating, so as to drive the driving member.

10. The locking mechanism according to claim 1, wherein the actuating handle comprises an interference fit structure, and when the actuating handle starts to drive the driving member, the actuating handle overcomes the interference fit before it moves.

11. The locking mechanism according to claim 1, wherein the actuating handle comprises a self-locking spring inside the actuating handle, and the self-locking spring can lock the actuating handle in a self-locked position.

12. A busway docketing box comprising a locking mechanism provided on one or both sides thereof, the busway docketing box being able to engage with a busway by the locking mechanism, wherein the locking mechanism comprising:

a driving member, which is capable of moving in a driving direction;

a first driven member and a second driven member, both of which are disposed axially symmetrically with respect to the driving direction and are coupled with the driving member so as to be driven by the driving member to move toward or away from each other along a driven direction of each of the first driven member and the second driven member respectively, the driven direction of each of the first driven member and the second driven member being transverse or oblique to the driving direction;

an actuating handle, which is coupled with the driving member to move the driving member in the driving direction;

wherein, the driving member comprises two driving member slide rails which are disposed axially symmetrically and obliquely relative to the driving direction, wherein each of the first driven member and the second driven member comprises one driven member slide rail which is oblique relative to the driving direction, and each of the driven member slide rails is nested in the corresponding driving member slide rails respectively.

13. The busway docketing box according to claim 12, further comprising a guide plate which guides the busway docketing box to move along the busway.

14. The busway docketing box according to claim 12, further comprising a protection plate which can only be inserted into a particular slot on the busway.

* * * * *